US006550931B1

United States Patent
Olson, Jr.

(10) Patent No.: US 6,550,931 B1
(45) Date of Patent: Apr. 22, 2003

(54) INSET LIGHT CONTAINER

(76) Inventor: Ted Olson, Jr., P.O. Box 880, Atkinson, NE (US) 68713

( * ) Notice: Subject to any disclaimer, the term of this patent is extended or adjusted under 35 U.S.C. 154(b) by 21 days.

(21) Appl. No.: 09/717,874

(22) Filed: Nov. 21, 2000

(51) Int. Cl.[7] .................................................. E01F 9/09
(52) U.S. Cl. ..................... 362/153.1; 362/153; 362/267; 362/366; 362/285; 362/418
(58) Field of Search ............................. 362/153.1, 153, 362/267, 285, 418, 366

(56) References Cited

U.S. PATENT DOCUMENTS

| 4,325,665 A | * | 4/1982 | Jukes ........................ 411/176 |
| 4,617,616 A | | 10/1986 | Juell et al. ................... 362/267 |
| 4,625,385 A | | 12/1986 | Kohler et al. ................... 29/467 |
| 4,709,973 A | * | 12/1987 | Waters et al. ................... 439/78 |
| 5,450,300 A | | 9/1995 | Rector, Jr. ................... 362/153.1 |
| 6,033,083 A | | 3/2000 | Reinert, Sr. .............. 362/153.1 |
| 6,113,245 A | | 9/2000 | Reinert, Sr. .............. 362/153.1 |
| 6,196,697 B1 | * | 4/2001 | Reinert, Sr. .............. 362/153.1 |

* cited by examiner

Primary Examiner—Sandra O'Shea
Assistant Examiner—Anabel Ton

(57) ABSTRACT

An inset light container includes a light fixture support container adapted to be embedded in the ground and having a flange formed along an upper end with a plurality of apertures formed therethrough to receive securement bolts. An insert is removably mounted in each aperture and includes a threaded hole to receive the securement bolts holding the light fixture to the top of the container. Each insert is removably mounted in the flange aperture to permit quick and simple replacement if a bolt is broken within the insert.

5 Claims, 3 Drawing Sheets

INSET LIGHT CONTAINER

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to containers for light fixtures which are embedded in and along airport runways or taxiways, and more particularly to an improved inset light container with threaded inserts for permitting simple and convenient replacement of broken bolts when changing light fixtures.

(2) Background Information

Inset light fixtures have been utilized at airports for many years to illuminate runways and taxiways. Typically, each lighting device includes a light fixture attached to the top of an embedded support container. The support container is typically a canister which houses the various electrical components for the light fixture, and which is embedded in the ground or concrete.

The light fixture can be of a wide variety of types and configurations. However, prior art lighting devices typically utilize a light fixture having a cover which mounts on the upper open end of the support container embedded in the ground. This light fixture cover is conventionally secured to a flange on the upper end of the container using a plurality of bolts extending through apertures in the fixture cover and into threaded openings in the flange of the container.

Because the lighting device is exposed to weather, including rain, snow, and any chemicals which are applied to the runway or surrounding grass, it is a common problem to find the bolts securing the light fixture to the container, rusted and deteriorated. Maintenance of the light fixtures, such as the replacement of light bulbs and/or repair of electrical problems within the canister, are a common requirement for such lighting devices. In order to permit access to the container, and to permit removal of the light fixture for repair, it is necessary to remove the securement bolts. Unfortunately, a common problem with such bolts is that they break, because of rust and erosion, and therefore require that the remaining portion of the broken bolt within the threaded opening of the flange be removed before the light fixture can be resecured to the container. Obviously, the container is not easily removed from its embedded position in the ground, thereby requiring that the broken bolt be removed on site. In most cases, this requires that the broken bolt be drilled out of the threaded aperture in the flange, and then rethreading the aperture. As with most on-site repairs, such repairs are typically necessary at the worst time of day, or night, and during the most inclement weather. Thus, it is desirable to repair the lighting device as quickly as possible.

In an attempt to provide a lighting device which is more easily repaired on site, U.S. Pat. No. 5,450,300 discloses a lighting device which includes a removable ring disposed below the flange within the container which includes threaded apertures into which the securement bolts are threaded. Passageways are formed in the flange of the container, such that the securement bolts pass freely through the flange openings and into the threaded apertures of the removable ring. In this way, if a bolt is broken, the removable ring is simply removed and replaced with a new ring, so that the light fixture may be immediately secured to the canister. The ring with the broken bolt shaft therein, may then be returned to a shop or other location for removal of the broken bolt and repair of the ring.

While the apparatus of the '300 patent is an improvement over prior art devices, it still requires an assortment of ring sizes and shapes, as well as various hole arrangements for a wide variety of container sizes. In addition, at least one-half of a split ring must be replaced in the event of a single bolt being broken.

BRIEF SUMMARY OF THE INVENTION

It is therefore a general object of the present invention to provide an improved inset light container that allows a light fixture to be quickly and easily repaired or replaced.

Another other is to provide an improved inset light container which does not require a removable support ring to secure the light fixture to the container.

Yet another object of the present invention is to provide an improved inset light container with individual inserts for each securement bolt, to permit quick and simple repair and replacement of a single insert upon the occurrence of the broken bolt.

These and other objects will be apparent to those skilled in the art.

The inset light container of the present invention includes a light fixture support container adapted to be embedded in the ground and having a flange formed along an upper end with a plurality of apertures formed therethrough to receive securement bolts. An insert is removably mounted in each aperture and includes a threaded hole to receive the securement bolts holding the light fixture to the top of the container. Each insert is removably mounted in the flange aperture to permit quick and simple replacement if a bolt is broken within the insert.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
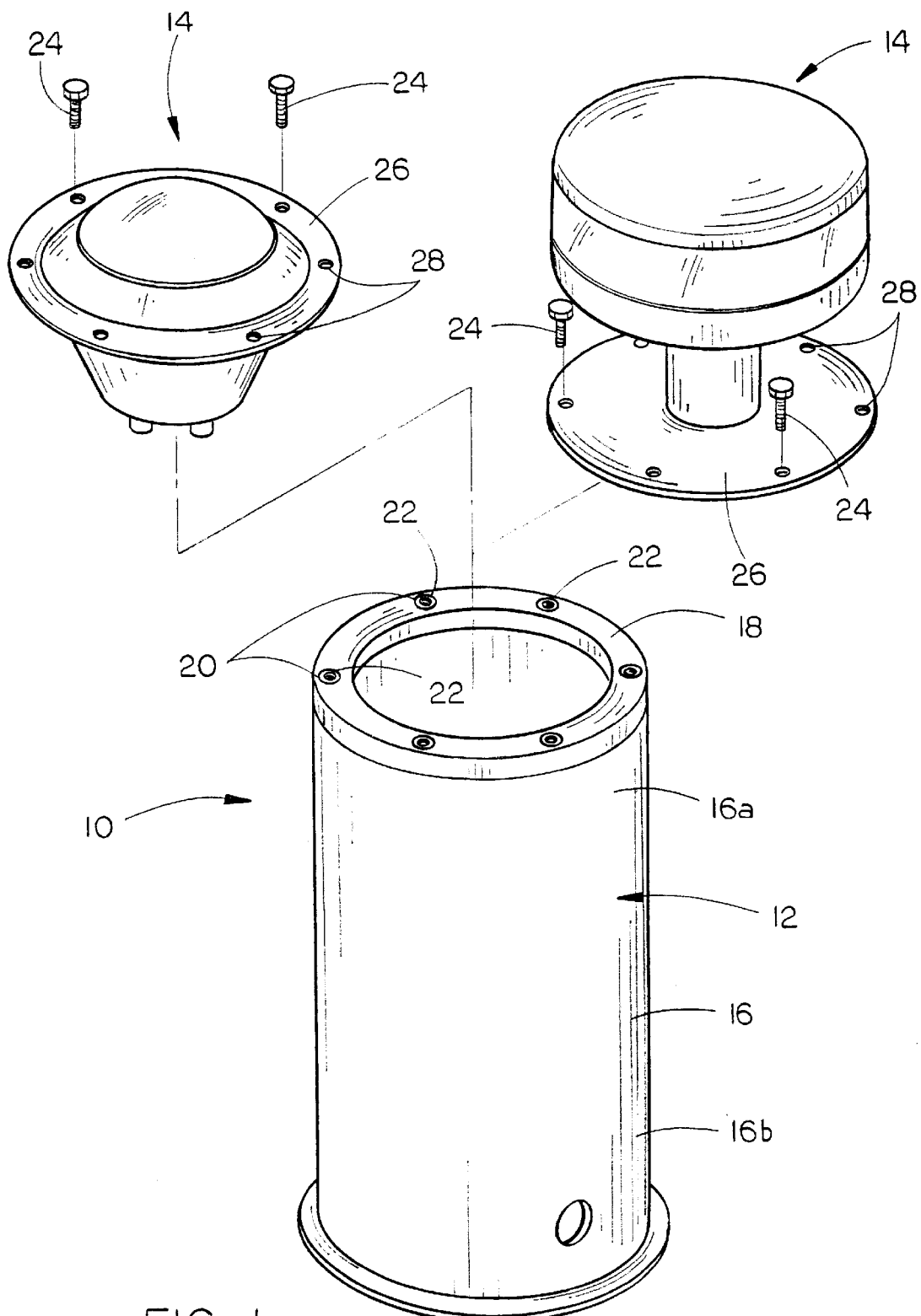
FIG. 1 is an exploded perspective view of the inset light container of the present invention showing two different embodiments of a light fixture adapted for attachment thereto.

Referring now to the drawings, and more particularly to FIG. 1, the inset lighting device of the present invention is designated generally at 10 and includes a light fixture support container 12 which will be embedded in the ground during use. A pair of light fixtures 14 are shown in FIG. 1, either one of which may be attached to container 12.

Container 12 includes a generally cylindrical side wall 16 having upper and lower ends 16a and 16b respectively. A flange 18 is mounted on the upper end 16a of side wall 16, and extends radially inwardly therefrom. A plurality of apertures 20 are formed through the flange 18 and are uniformly spaced around the perimeter of the flange. Each aperture 20 has an insert 22 mounted therein, which will receive and engage a bolt 24 to secure a light fixture 14 to the upper end of canister 12. Each of light fixtures 14 includes a cover 26 which is generally circular in shape and sized to cover the open upper end of canister 12. Covers 26 include a plurality of openings 28 formed in a perimeter portion 30. Openings 28 are positioned for alignment with inserts 22 in apertures 20, such that bolts 24 will secure cover 26 in light fixture 14 to container 12.

Figure 2:
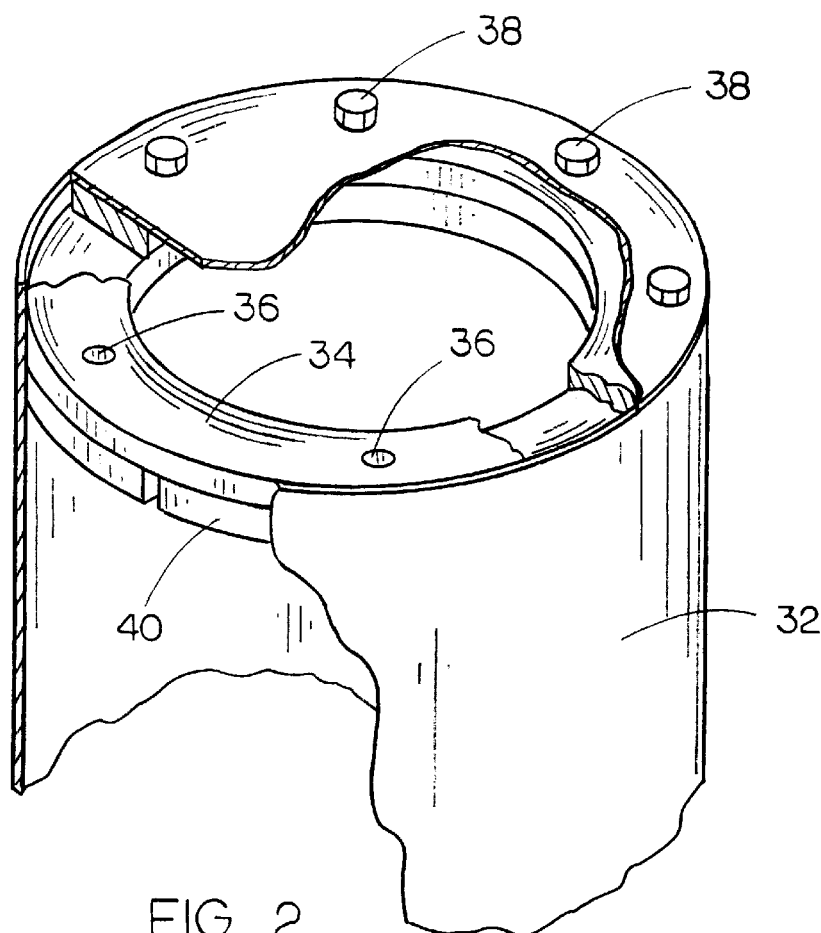
FIG. 2 is a perspective view of a prior art container with portions shown in sectional view.
Figure 3:
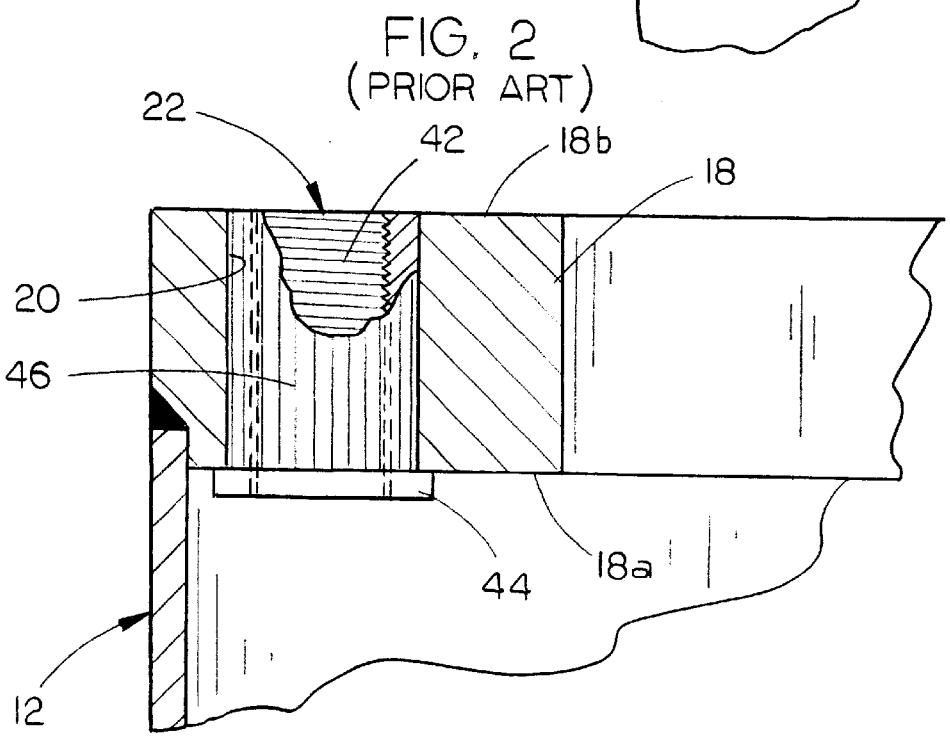
FIG. 3 is an enlarged sectional view through the flange of the container of the present invention, and showing an insert of the present invention installed in an aperture in the flange.

Referring now to FIG. 2, a prior art container 32 is shown with a flange 34 along the upper end thereof. A plurality of openings 36 in the flange will receive bolts 38 and permit them to pass freely therethrough to engage threaded apertures in a split ring 40 positioned under flange 34. The use of threaded inserts 22 of the present invention shown in FIG. 3, does away with the need for split ring 40 of the prior art device. Insert 22 is a generally cylindrical member with a threaded hole 42 extending longitudinally therethrough. A lip 44 projects radially outwardly from the lower end of insert 22 and contacts the lower face 18a of flange 18 to prevent the insert from being removed from the upper face 18b of the flange 18.

A plurality of longitudinal ridges 46 project radially from the exterior wall of insert 22 and frictionally engage the interior wall surface of flange apertures 20, to prevent rotation of the insert 22 within the aperture 20. In addition, the frictional engagement of ridges 46 with the side wall of aperture 20 will retain insert 22 within aperture 20 until a bolt can be threaded into threaded hole 42. Without this frictional engagement insert 22 would drop vertically out of the aperture 20.

Figure 4:
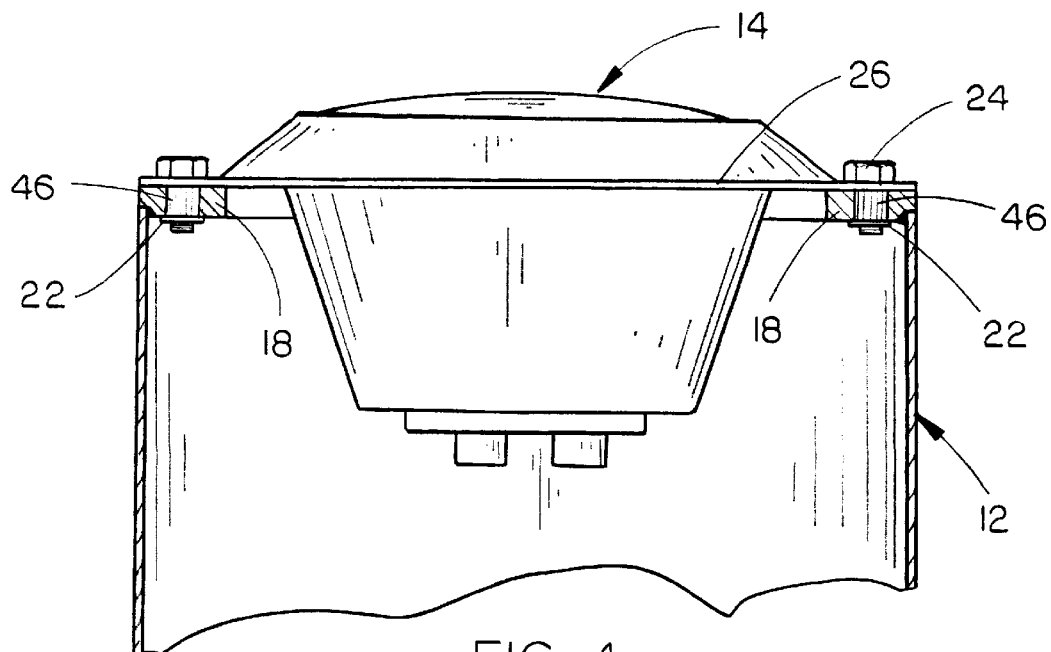
FIG. 4 is a sectional view through the upper end of the container of the present invention, showing a light fixture installed thereon.
Figure 5:
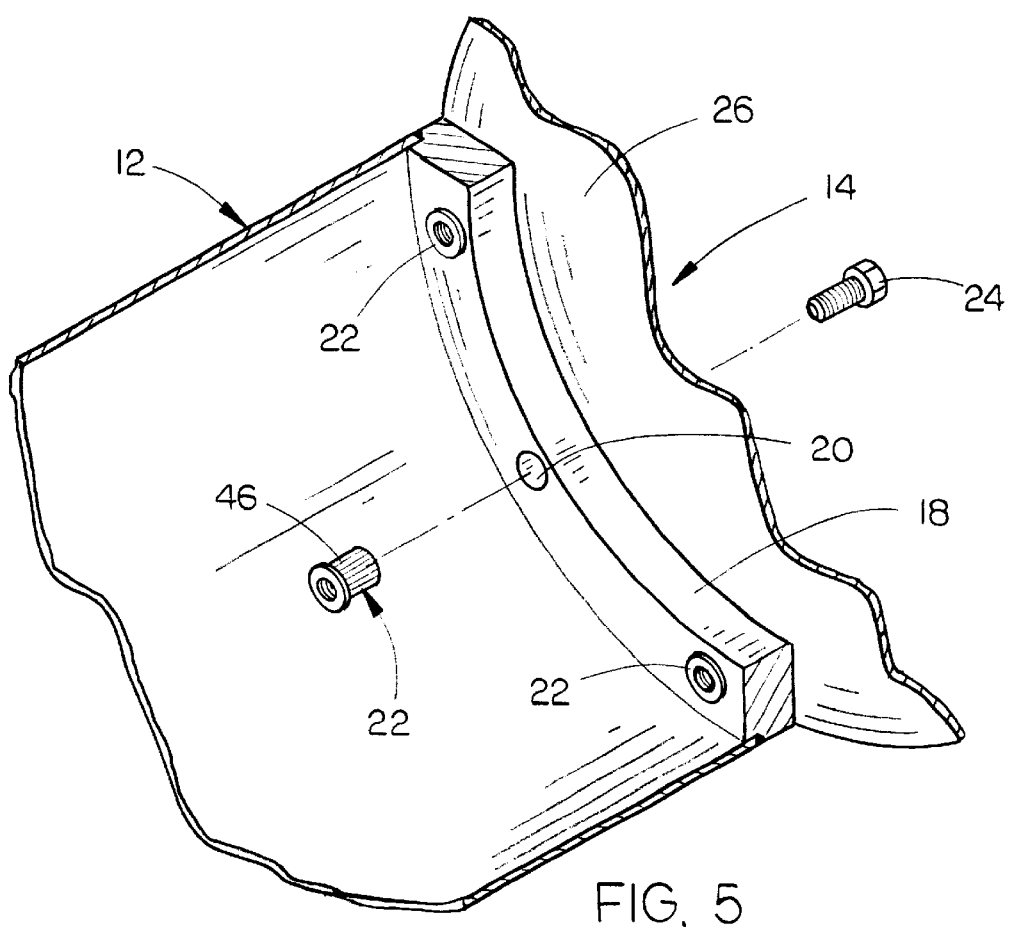
FIG. 5 is an exploded perspective view showing the connection of an insert and a bolt for securing a light fixture to a container.

Referring now to FIGS. 4 and 5, a light fixture 14 may be installed or replaced on a container 12 quickly and easily. Inserts 22 are journaled into apertures 20 in flange 18 from the underside of flange 18 and retained in position by the frictional engagement of the ridges 46 on the exterior surface of the threaded insert. The cover 26 of light fixture 14 is then positioned on the upper end of container 12 and bolts 24 are threaded into inserts 22 to secure the light fixture into position. It can be seen that, if a bolt 24 breaks the light fixture may still be easily replaced simply by removing the insert 22 with the broken bolt shaft and replacing it with a new insert.

Whereas the invention has been shown and described in connection with the preferred embodiment thereof, many modifications, substitutions and additions may be made which are within the intended broad scope of the appended claims.

I claim:

1. An inset light container, comprising:
   a light fixture support container adapted to be at least partially embedded to support a light fixture along a runway;
   a radially inwardly extending flange formed along an upper end of the container, having a plurality of apertures formed therethrough spaced uniformly along the flange;
   an insert removably mounted in each aperture, removable only from a lower face of the flange, each insert having an interiorly threaded hole formed therethrough;
   a light fixture mounted on the flange, including a cover with a generally circular perimeter portion;
   the perimeter portion having a plurality of openings therethrough positioned in alignment with the container flange apertures; and
   a plurality of bolts journaled through the openings and engaging the threaded apertures in the inserts to secure the fixture to the container.

2. The container of claim 1, wherein each insert is generally cylindrical, with a longitudinal axis coaxial with the threaded hole, and includes upper and lower ends and an exterior wall.

3. The container of claim 2, wherein the insert exterior wall includes means for preventing rotation of the insert within the flange aperture.

4. The container of claim 3, wherein the means for preventing rotation of the insert includes a plurality of longitudinal ridges projecting radially from the exterior wall and frictionally engaging an interior wall surface of the flange apertures.

5. The container of claim 1, wherein said insert further includes a lip projecting radially outwardly from the lower end thereof, having a diameter greater than a diameter of the flange aperture, to prevent removal of the insert out an upper face of the flange.

\* \* \* \* \*